United States Patent
Nagata (10) Patent No.: US 7,545,414 B2
(45) Date of Patent: Jun. 9, 2009

(54) IMAGE RECORDING APPARATUS WITH MEMORY PARTITIONED AND PASSWORD PROTECTED FOR MULTIPLE USERS

(75) Inventor: Hiroshi Nagata, Cyoufu (JP)

(73) Assignee: Olympus Imaging Corp., Tokyo (JP)

(*) Notice: Subject to any disclaimer, the term of this patent is extended or adjusted under 35 U.S.C. 154(b) by 637 days.

(21) Appl. No.: 11/336,062

(22) Filed: Jan. 20, 2006

(65) Prior Publication Data
US 2006/0176595 A1 Aug. 10, 2006

(30) Foreign Application Priority Data
Feb. 8, 2005 (JP) ............................. 2005-032344

(51) Int. Cl.
*H04N 5/76* (2006.01)
(52) U.S. Cl. ............. 348/231.2; 348/231.3; 348/231.99
(58) Field of Classification Search ............. 348/231.2, 348/231.3, 231.99
See application file for complete search history.

(56) References Cited

U.S. PATENT DOCUMENTS

| | | | | |
|---|---|---|---|---|
| 6,629,193 | B1* | 9/2003 | Browning | 711/104 |
| 7,114,051 | B2* | 9/2006 | Guu et al. | 711/173 |
| 2003/0154485 | A1* | 8/2003 | Johnson et al. | 725/89 |
| 2003/0174217 | A1* | 9/2003 | Kito et al. | 348/231.2 |
| 2005/0177698 | A1* | 8/2005 | Ku et al. | 711/173 |

FOREIGN PATENT DOCUMENTS

| | | |
|---|---|---|
| JP | 2000330850 | 11/2000 |
| JP | 2003-288239 | 10/2003 |

OTHER PUBLICATIONS

Office Action from counterpart Chinese Application No. 2006100022542.

* cited by examiner

*Primary Examiner*—James M Hannett
(74) *Attorney, Agent, or Firm*—Volpe and Koenig, P.C.

(57) ABSTRACT

A recording medium of an image recording apparatus such as a digital camera is divided into multiple partitions, for each of which an access key such as a password is set to provide access security on a per-partition basis. Therefore, when multiple people share one recording medium, each person can prohibit other persons from accessing his or her files on the recording medium.

10 Claims, 11 Drawing Sheets

```
          ┌──── SETTING ────┐
          │ MODE      : M           │
          │ SHUTTER   : 1/100       │
          │ FNUMBER   : 5.0         │
          │ ISO       : 100         │
          │ FLASH     : AUTO        │
          │ QUALITY   : SQ2         │
          └─────────────────────────┘
```

IMAGE RECORDING APPARATUS WITH MEMORY PARTITIONED AND PASSWORD PROTECTED FOR MULTIPLE USERS

CROSS-REFERENCE TO RELATED APPLICATION

This application is based upon and claims the benefit of priority from prior Japanese Patent Application No. 2005-032344, filed on Feb. 8, 2005, the entire contents of which are incorporated herein by reference.

BACKGROUND OF THE INVENTION

1. Field of the Invention

The present invention relates to an image recording apparatus for recording image data on a recording medium.

2. Description of the Related Art

For example, the digital camera is known as a conventional image recording apparatus for recording image data on a recording medium. As a recording medium installed in a digital camera increases in capacity, the number of instances that multiple people such as family members or friends share one recording medium of the digital camera increases. In this case, if the digital camera has a function of selecting recording destination folders, each user can select a recording destination folder using this function before shooting so that image data will be classified by user and recorded on the recording medium on a user-by-user basis.

However, such a digital camera allows everyone to reproduce (display), erase, and copy any image data classified by user. Therefore, even if a user does not want other users to access some of his or her image data, such as image data that the user does not want to show to other users or to be erased without his or her consent, the access cannot be prevented.

On the other hand, Japanese Patent Laid-Open No. 2003-288239 discloses a server system in which a virtual partition is created in a storage and allocated to a group of registered users. In this server system, the usage conditions of the virtual partition are set on a per-group basis, and an exclusive access control is provided within logged-in multiple users in the group corresponding to the virtual partition.

The access control described in Japanese Patent Laid-Open No. 2003-288239 may be considered as a solution to the above-mentioned problem with the digital camera. However, the access control is suitable for a file-sharing system on a network, but not for use in an image recording apparatus such as the above-mentioned digital camera because its architecture is too complicated to implement for such an image recording apparatus.

BRIEF SUMMARY OF THE INVENTION

An image recording apparatus of the present invention has a recording medium divided into multiple partitions in such a manner that at least some partitions will be allocated to specific users, respectively. Information in a partition allocated to a specific user is so protected that other users cannot access the information. The division of a recording medium into multiple partitions may be fixed or dynamically variable.

For example, the image recording apparatus includes a first selection section for selecting a partition from the multiple partitions as a partition to be used; a first determination section for determining whether a user intending to use the partition is the user to whom the partition selected by the first selection section is allocated, and setting section for setting the partition selected by the first selection section as the partition to be used when the first determination section determines that the user intending to use the partition is the user to whom the partition selected by the first selection section is allocated. This configuration makes it easy to associate a user with a partition.

The partition set by the setting section can be used as the recording destination of image data.

Further, if the image recording apparatus of the present invention has a reproducing section for reproducing image data from the recording medium, the reproducing section can use the partition set by the setting section as the source of image data to be reproduced.

To be more specific, for example, each of the multiple partitions allocated to respective users can store a password file describing a password so that the first determination section will make the above-mentioned determination based on an entered password and the password described in the password file recorded on the partition selected by the first selection section.

Biological information such as a fingerprint can also be used instead of a password.

The image recording apparatus can further have a copy function. The copy function includes both copying and moving. Here, copying means that the original data is left intact after copying the data, while moving means that the original data is erased after copying the data.

To be more specific, for example, the image recording apparatus further includes second selection section for selecting a partition from the multiple partitions as a copying or moving destination partition; second determination section for determining whether an entered password matches a password described in a password file recorded on the partition selected by the second selection section; and a function for copying or moving image data from the partition set by the setting section to the partition selected by the second selection section when the second determination section determines that the passwords match.

Further, the image recording apparatus can include password change section for changing the password described in the password file. The password can be defined as a combination of operations of buttons provided on the image recording apparatus.

Furthermore, in the image recording apparatus, each of the multiple partitions can store an apparatus setup file describing parameters related to the setup of the image recording apparatus so that the image recording apparatus can be set up according to the parameters related to the apparatus settings described in the apparatus setup file recorded on the partition set by the setting section. This configuration allows the image recording apparatus to inherit the settings on a per-partition basis.

For example, the image recording apparatus can include apparatus setup file updating section for updating the descriptive contents of the apparatus setup file. In this case, when the image recording apparatus is powered off, the apparatus setup file updating section can change (update) the descriptive contents of the apparatus setup file recorded on the partition in use just before power shutdown to the parameters related to the apparatus settings selected for the image recording apparatus just before power shutdown. On the other hand, when the setting section changes the current partition to another partition, the apparatus setup file updating section can change the descriptive contents of the apparatus setup file recorded on the partition in use just before the change to the parameters related to the apparatus settings selected for the image recording apparatus just before the change.

Further, when the image recording apparatus is communicably connected to an external device, it can be configured that the partition of the recording medium the external device can access is limited to the partition set by the setting section.

According to the present invention, when multiple people share one recording medium in the image recording apparatus such as a digital camera, each person can prohibit other persons from accessing his or her files on the recording medium.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

One preferred embodiment of the present invention is described below with reference to the accompanying drawings.

Figure 1:
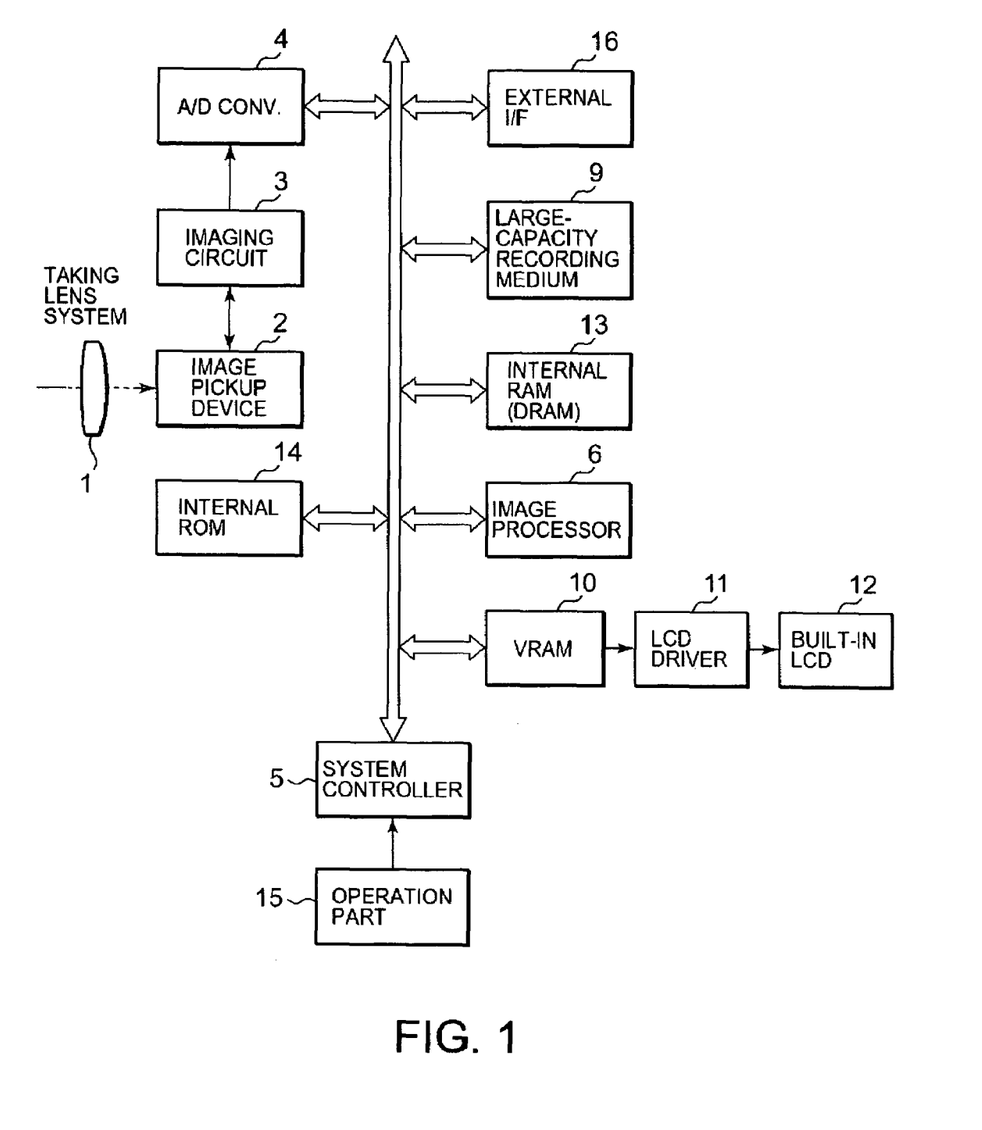
FIG. 1 is a block diagram showing the principle configuration of a digital camera described as an image recording apparatus according to one preferred embodiment of the present invention.

FIG. 1 is a block diagram showing the principle configuration of a digital camera described as an image recording apparatus according to one preferred embodiment of the present invention. The digital camera according to the embodiment conforms to DCF (Design rule for Camera File system), and uses a FAT (File Allocation Table) file system.

Upon shooting with the digital camera, a subject image is formed by a taking lens system 1, photoelectrically converted by an image pickup device 2 into an electrical signal, subjected to a predetermined imaging process through an imaging circuit 3, and A/D converted by an A/D converter 4. The A/D converted digital data (image data) is temporarily stored in an internal RAM (Random Access Memory) 13, that is a DRAM (Dynamic Random Access Memory). The temporarily stored image data is subjected to predetermined image processing by means of a system controller 5, compressed by an image processor 6 in a predetermined manner, and recorded as an image file on a large-capacity recording medium (e.g., a hard disk) 9.

Upon reproduction, the image data is read from the recording medium 9, expanded or decompressed by the image processor 6 in a predetermined manner, subjected to predetermined image processing by means of the system controller 5, and stored in a VRAM (Video Random Access Memory) 10 so that the image will be displayed on a built-in LCD (Liquid Crystal Display) 12 via an LCD driver 11.

In FIG. 1, the internal RAM 13 is used for temporary storage of image data being processed by the image processor 6 and as a work area for the system controller 5 to perform control processing or the like, as well as for temporary storage of image data A/D converted by the A/D converter 4. The control processing by the system controller 5 includes the updating of a password file and a camera parameter setting file (apparatus setup file) to be described later.

The system controller 5 includes a CPU (Central Processing Unit), which reads out and executes a camera program stored in an internal ROM (Read Only Memory) 14 to control the entire operation of the digital camera.

The operation part 15 includes an arrow pad with small arrows pointing in four directions (Up, Down, Left, and Right), a shutter-release button, an OK button, a reproduction button, a telephoto zoom button, a wide-angle zoom button, a power button, and the like, to inform the system controller 5 of the instructions accepted. The arrow pad is to instruct the movement of a cursor. The shutter-release button is to instruct shooting. The OK button is to display a menu or to confirm the user's choice. The reproduction button is to instruct reproduction of an image or images. The telephoto zoom button is to instruct zooming in. The wide-angle zoom button is to instruct zooming out. The power button is to instruct power on or off of the digital camera. As will be described later in detail, multiple pressing operations of these buttons are also used to enter a password.

An external I/F 16 enables the exchange of data with an external device such as a PC (Personal Computer) through a USB cable.

The following describes the operation of the digital camera.

Assuming that multiple users share this digital camera, the digital camera can prohibit each user from reproducing, erasing, or copying other users' image data recorded on the recording medium 9. Specifically, the recording medium 9 is pre-divided into multiple partitions to allocate a partition to each user by using a password. This disables each user from accessing image data recorded on the partitions allocated to other users.

Figure 2:
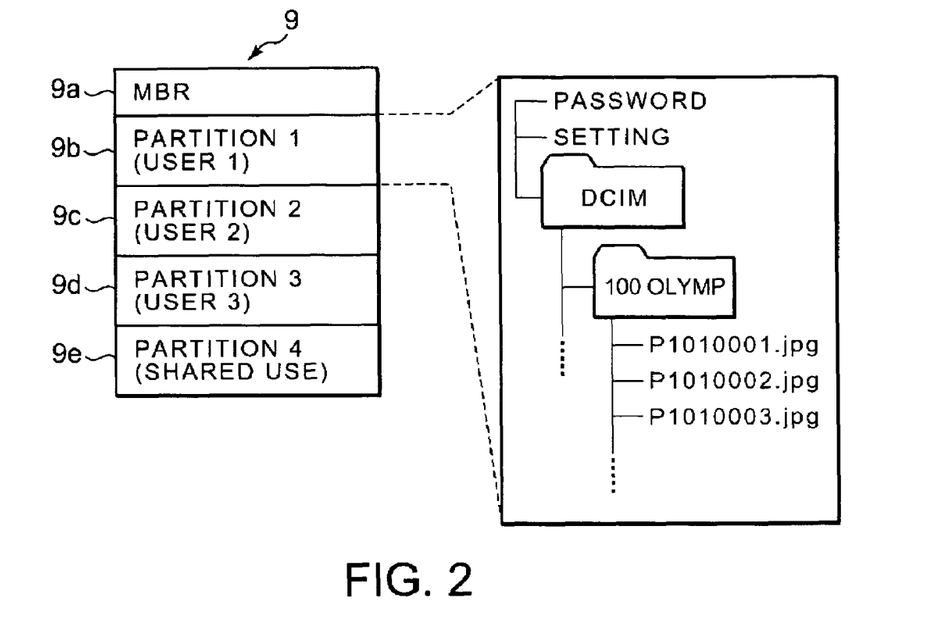
FIG. 2 is a diagram showing an example of the memory structure of a recording medium.
Figure 3:
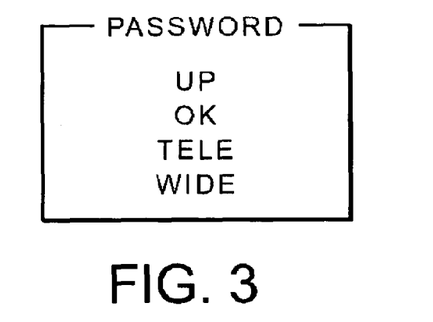
FIG. 3 is a diagram showing an example of the descriptive contents of a password file.
Figure 4:
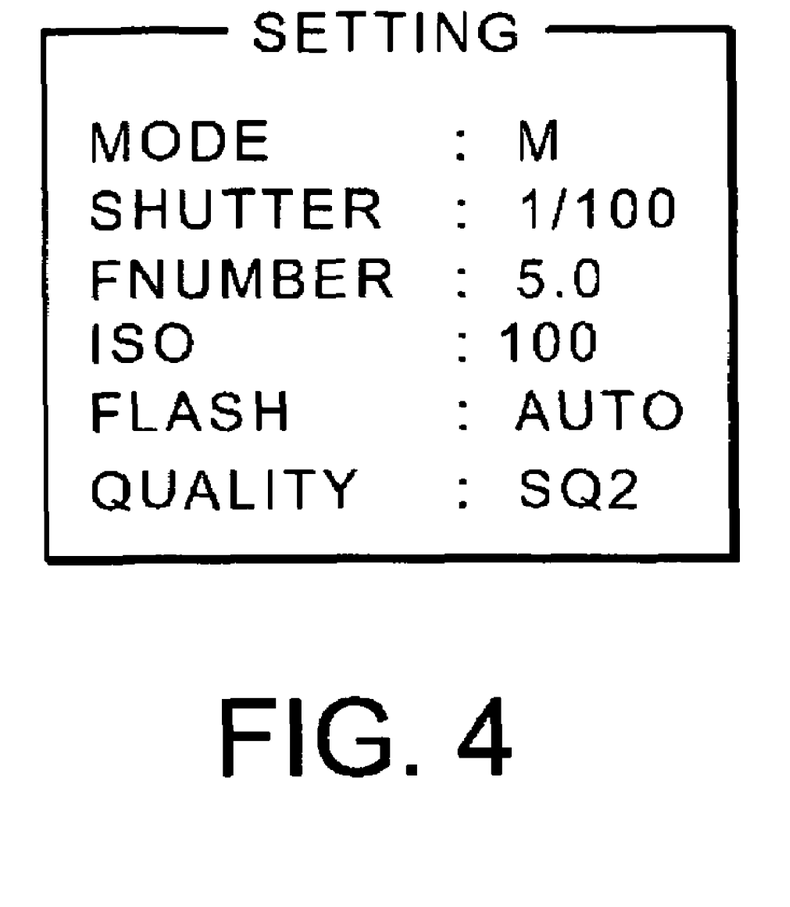
FIG. 4 is a diagram showing an example of the descriptive contents of a camera parameter setting file.

First of all, the recording medium 9 divided into multiple partitions and the password file and camera parameter setting file recorded on the recording medium 9 are described using FIGS. 2 to 4.

FIG. 2 is a diagram showing an example of the memory structure of the recording medium 9.

In the embodiment, the recording medium 9 is divided into four partitions. The partitions are factory-configured.

However, the division of the recording medium 9 into partitions is not limited to be factory-configured. For example, it can be configured so that the division of the recording medium 9 into partitions is made by each user. In other words, each user can be allowed to format the recording medium 9 so that the recording medium 9 is to be divided into any number or size of partitions. Further, the size of each divided partition can be either fixed or dynamically variable according to the usage rate of the partition.

As shown in FIG. 2, the recording medium 9 includes a master boot record (hereafter called "MBR") 9a, and four divided partitions 9b, 9c, 9d, and 9e. The partitions 9b to 9e are also called "PARTITION 1," "PARTITION 2," "PARTITION 3," and "PARTITION 4."

The MBR 9a holds information about each of the partitions 9b to 9e, that is, the top sector of the each partition and the length (number of sectors) from the top sector, so that access to a specific partition is made possible by referring to the information.

Further, in the embodiment, the partitions 9b to 9d are allocated to "USER 1," "USER 2," and "USER 3," and the partition 9e is allocated for "SHARED USE."

In each of the partitions 9b to 9d, a password file ("PASSWORD" in FIG. 2) and a camera parameter setting file ("SETTING" in FIG. 2) are prerecorded at the same hierarchy level as a "DCIM" folder. Note that although the partition 9e contains the camera parameter setting file prerecorded at the same hierarchy level as the "DCIM" folder, the password file is not recorded because the partition 9e allocated for "SHARED USE."

The password file contains a password to determine whether the partition with the password recorded on it is available. The partition is available as long as the entered password matches the password described in the password file recorded on the partition.

The camera parameter setting file contains camera parameters (e.g., camera parameters in a shooting or reproduction mode) at the last use of the partition with the camera parameter setting file recorded on it. For example, suppose that "USER 2" uses the partition 9c after "USER 1" uses the partition 9b, and "USER 2" changes at least one of the camera parameter settings. In this case, if "USER 1" uses the partition 9b again, the digital camera will be set up automatically according to the descriptive contents of the camera parameter setting file recorded on the partition 9b. Therefore, the camera parameter settings used by "USER 1" last time are automatically loaded. In other words, the camera parameters for "USER 1" using the partition 9b are recorded in the camera parameter setting file on the partition 9b, while the camera parameters for "USER 2" using the partition 9c are recorded in the camera parameter setting file on the partition 9c. This allows both the parameter setting files to be independent of each other so that they do not affect each other.

A default password and default camera parameters were set in the password file and the camera parameter setting file on each partition at the factory or the like. Further, image files (image data) are recorded on each of the partitions 9b to 9e according to DCF described above.

FIG. 3 is a diagram showing an example of the descriptive contents of the above-mentioned password file.

In the embodiment, a combination of button presses is used as a password as mentioned above. Specifically, a combination of four button presses, selected from among the arrow pad, the shutter-release button, the OK button, the reproduction button, the telephoto zoom button, and the wide-angle zoom button, is used as a password, and the order of the button presses are described in the password file.

In the example of FIG. 3, "UP," "OK," "TELE," and "WIDE" are described in the password file. In this case, the user presses the UP-arrow button ("UP"), the OK button ("OK"), the telephoto zoom button ("TELE"), and the wide-angle zoom button ("WIDE") in this order so that the partition with the password file recorded on it will be available to the user.

In the embodiment, the password is used as an access key in this manner. However, the present invention can also be implemented using an access key other than password. For example, biological information such as a fingerprint or retina pattern may also be used as an access key.

FIG. 4 is a diagram showing an example of the descriptive contents of the above-mentioned camera parameter setting file.

In the example of FIG. 4, exposure mode, shutter speed, aperture (f-number), ISO-equivalent sensitivity, flash mode, and image quality are described as camera parameters. The exposure mode (selectable among Program (P), Aperture Priority (A), Shutter Priority (S), and Manual (M)) is set to Manual ("MODE: M"). The shutter speed is set to $1/100$ ("SHUTTER: $1/100$"). The aperture (f-number) is set to 5.0 ("FNUMBER: 5.0"). The ISO-equivalent sensitivity is set to 100 ("ISO: 100"). The flash mode is set to Auto ("FLASH: AUTO"). The image quality (selectable among SHQ, HQ, SQ1, and SQ2) is set to SQ2 ("QUALITY: SQ2").

Although only the camera parameters in the shooting mode are shown in FIG. 4 for convenience, camera parameters in the reproduction mode (e.g., index reproduction, etc.) are also described for the record.

This camera parameter setting file is updated when the camera is powered off, or when another partition is chosen by partition select processing to be described later. In such a case, the camera parameters just before power shutdown or partition change are saved in the file.

The following describes the details of the above-mentioned operation of the digital camera.

Figure 5:
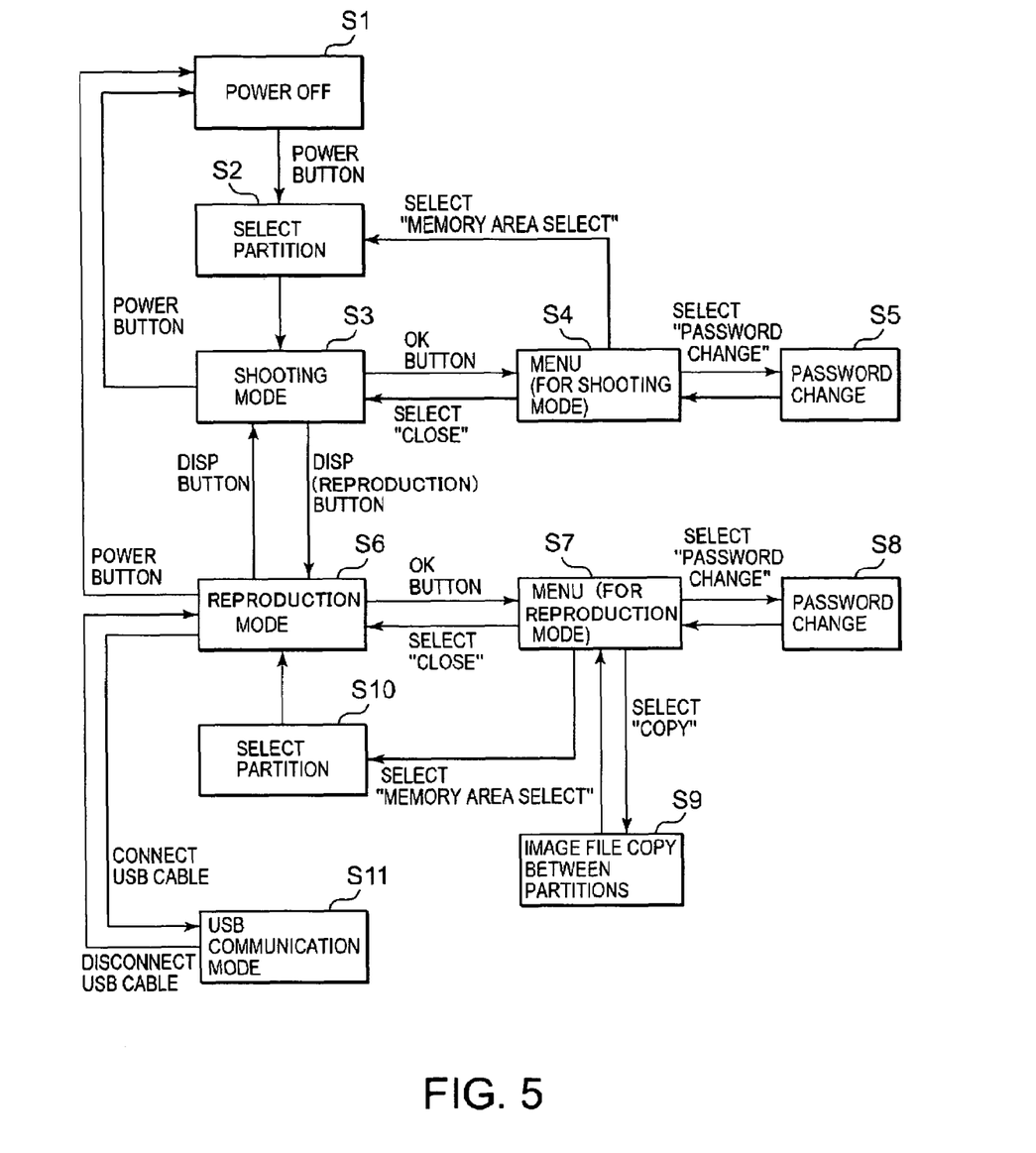
FIG. 5 is a flowchart showing an example of the operation of the digital camera.

FIG. 5 is a flowchart showing an example of the operation of the digital camera. FIG. 5 shows the general flow and important processing steps will be described in detail later. As shown in FIG. 5, when the power button is pressed in a power-off state of the camera (Step (hereinafter simply abbreviated as "S") 1), partition select processing is performed to select and set a partition (to be used) for recording/reproducing (S2), and after completion, the procedure shifts to the shooting mode (S3). During shooting in the shooting mode, image data (image file) is recorded on the partition set by the partition select processing in S2 or S10.

In the shooting mode (S3), when the OK button is pressed, a menu screen for shooting mode is displayed on the built-in LCD 12 (S4) so that the user will select a menu item to perform predetermined processing. In other words, when "PASSWORD CHANGE" is selected from the menu, password change processing is performed (S5), and after completion, the procedure returns to S4. When "MEMORY AREA SELECT" is selected, the procedure returns to S2. When "CLOSE" is selected, the procedure returns to S3.

When the power button is pressed in the shooting mode (S3), the procedure returns to S1 to power off the camera.

On the other hand, when the reproduction button (Disp) is pressed in the shooting mode (S3), the procedure shifts to the reproduction mode (S6). This reproduction mode allows the user to reproduce (display), erase, or edit image data (image file) recorded on the partition set by the partition select processing in S2 or S10.

It the reproduction mode (S6), when the OK button is pressed, a menu screen for reproduction mode is displayed on the built-in LCD 12 (S7) in the same manner as in S4 so that the user can select a menu item to perform predetermined processing. In other words, when "PASSWORD CHANGE" is selected from the menu, password change processing is performed (S8), and after completion, the procedure returns to S7. When "COPY" is selected, image file copy processing is performed between partitions (S9), and after completion, the procedure returns to S7. When "MEMORY AREA SELECT" is selected, the partition select processing (S10) is performed in the same manner as in S2, and after completion, the procedure returns to S6. When "CLOSE" is selected, the procedure returns to S6.

When the reproduction (Disp) button is pressed in the reproduction mode (S6), the procedure returns to the shooting mode in S3. When the power button is pressed, the procedure returns to S1 to power off the camera.

On the other hand, when an external I/F 16 and an external device such as a PC are connected through a USB cable in the reproduction mode (S6), the procedure shifts to a USB cable communication mode (S11), while when the USB cable is disconnected, the procedure returns to S6.

In this flow, when the power button is pressed in the shooting mode (S3), or when the power button is pressed in the reproduction mode (S6), or when the partition used for recording/reproducing is changed to another partition in the partition select processing (S2 or S10), the contents of the camera parameter setting file are updated. In this case, the descriptive contents of the camera parameter setting file recorded on the partition set for recording/reproducing just before the change is updated to the camera parameters set for the digital camera just before the change.

The following describes the details of part of the processing in the above-mentioned operation of the digital camera using FIGS. 6 through 12.

Figure 6:
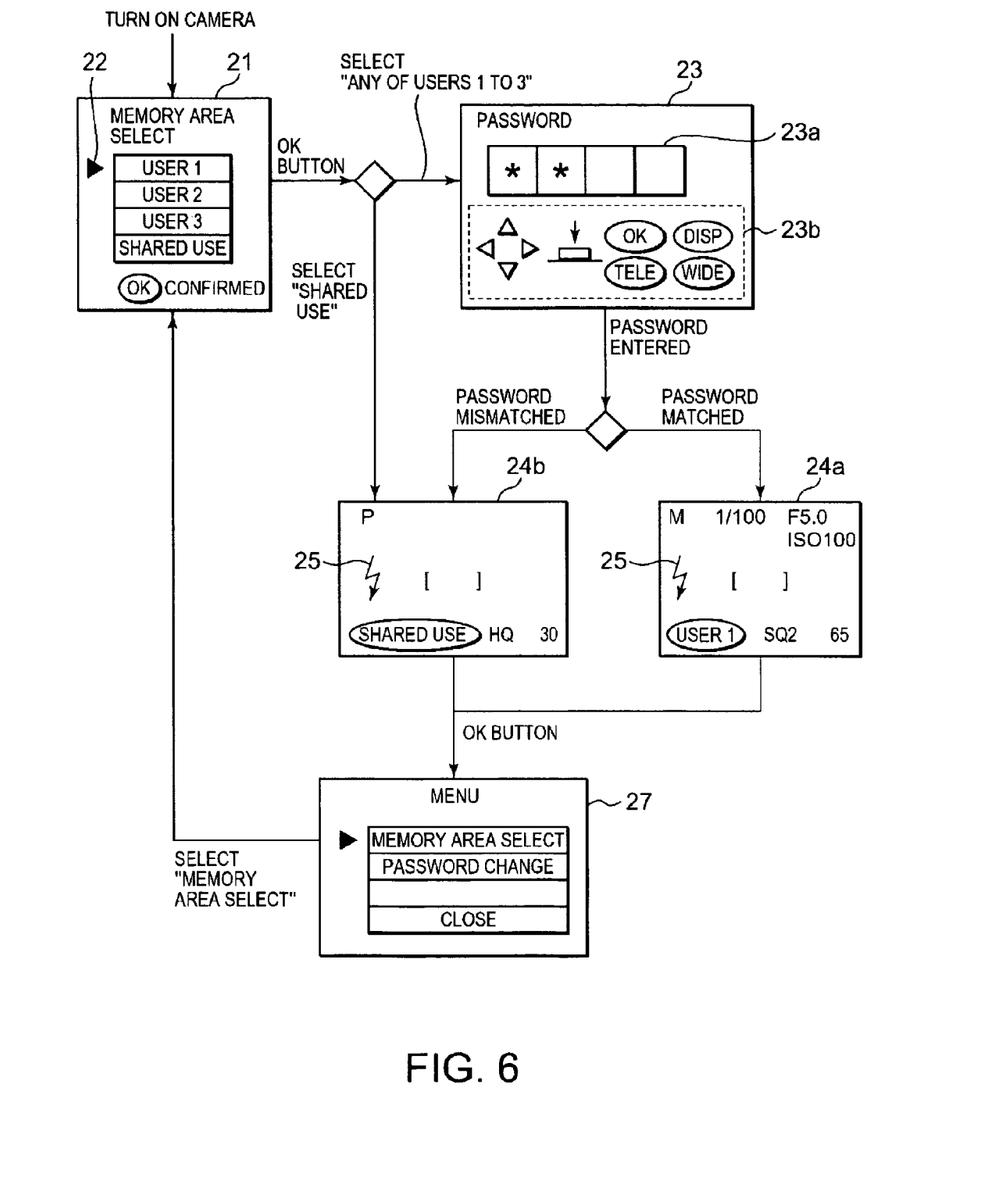
FIG. 6 is a diagram for giving a detailed description of processing S2 to S4 using the images of screens displayed on a built-in LCD.

FIG. 6 is a diagram for giving a detailed description of the processing S2 to S4 using the images of screens displayed on the built-in LCD 12.

As shown in FIG. 6, when the power button is pressed in the power-off state of the camera, the partition select processing of S2 is initiated. First, the digital camera shows a memory area select screen (also called "partition select screen") 21 on the built-in LCD 12.

On the screen 21, allocated destination partitions are displayed as selectable partitions. In the embodiment, as shown in FIG. 2, the partition 9b ("PARTITION 1") is allocated to "USER 1," the partition 9c ("PARTITION 2") to "USER 2," the partition 9d ("PARTITION 3") to "USER 3," and the partition 9e ("PARTITION 4") for "SHARED USE." Therefore, "USER 1," "USER 2," "USER 3," and "SHARED USE" are displayed as menu items or options.

The user chooses a desired item to perform processing according to the item chosen. In other words, the user presses the arrow pad to move a cursor 22 up or down, and when the cursor 22 comes to the desired item, presses the OK button to select the item (the same sequence of button-press operations are performed to select an item from any other screen).

When the user selects one of "USER 1," "USER 2," and "USER 3" on the screen 21, a password entry screen 23 is displayed on the built-in LCD 12.

On the screen 23, a password entry field 23a and a list of buttons 23b usable to enter a password are displayed. An asterisk mark "*" appears in the password entry field 23a each time the user presses one button to enter a password. All the buttons usable to enter a password are shown in the button list 23b. In the embodiment, icons indicating the arrow pad, the shutter-release button, the OK button, the reproducing (Disp) button, the telephoto zoom button, and the wide-angle zoom button are displayed as usable buttons.

The user enters a password in the password entry field 23a on the screen 23, that is, the user presses four buttons in sequence to enter the password, which allows the user to use, for recording/reproducing, the partition related to the item selected on the memory area select screen 21. Upon receipt of the password, the digital camera checks whether the password matches a password described in the password file recorded on the partition related to the item selected on the memory area select screen 21. If they match, the partition related to the item selected on the memory area select screen 21 is set as the partition to be used for recording/reproducing. After completion of setting, the procedure shifts to the shooting mode in S3.

For example, suppose that the user is "USER 1" and selects "USER 1" on the memory area select screen 21. In this case, if the user enters his or her password (password for enabling the use of the partition 9b allocated to the user for recording/reproducing) on the next password entry screen 23, the partition 9b is set as the partition for recording/reproducing.

On the other hand, if they do not match, or when the user selected the "SHARED USE" item on the memory area select screen 21, the partition 9e for "SHARED USE" is set as the partition for recording/reproducing, and after completion of setting, the procedure shifts to the shooting mode in S3.

In the embodiment, when the passwords do not match, the partition 9e for shared use is set to enable the use of the digital camera in consideration of such a case that the user is not sure what is his or her password or the like.

When the procedure shifts to the shooting mode in S3, the digital camera is set up according to the descriptive contents of the camera parameter setting file recorded on the partition set for recording/reproducing. Then, the digital camera shows a see-through screen 24a or 24b on the built-in LCD 12 with indicators superimposed on it, and stands ready for shooting. When the user shoots in this ready state, the captured image data is recorded on the partition set for recording/reproducing.

The indicators superimposed on the see-through screen 24a or 24b include not only the settings of the digital camera, but also the allocated destination partition set for recording/reproducing, the number of recordable frames, etc.

For example, the see-through screen 24a in FIG. 6 is displayed when the passwords match, indicating that the partition 9b is set for recording/reproducing. On the see-through screen 24a, the settings of the digital camera are indicated as follows: The shutter speed is "$1/100$," the f-number is "5.0," the ISO-equivalent sensitivity is "ISO 100," the flash mode is fill-in flash mode indicated with an icon 25 (which means that flash fires with every shot), and the image quality is "SQ2." Also displayed on the see-through screen 24a are "USER 1" indicating that the partition 9b is set for recording/reproducing and "65" indicating the number of frames recordable on the partition 9b. When the user shoots in this state, the captured image data is recorded on the partition 9b.

On the other hand, when the passwords do not match, or when the user selected "SHARED USE" on the memory area select screen 21, the see-through screen 24b in FIG. 6 is displayed. The see-through screen 24b is displayed when the partition 9e is set for recording/reproducing. Displayed on the see-through screen 24b are "P" for exposure mode and "HQ" for image quality as the settings of the digital camera, and "SHARED USE" indicating that the partition 9e is set for recording/reproducing and "30" indicating the number of frames recordable on the partition 9e. When the user shoots in this state, the captured image data is recorded on the partition 9e.

In this ready state (when the see-through screen 24a or 24b is displayed), if the user presses the OK button, the processing S4 is initiated to show a shooting mode menu screen 27 on the built-in LCD 12.

On the screen 27, "MEMORY AREA SELECT," "PASSWORD CHANGE," and "CLOSE" are displayed as menu items or options. When the user chooses "MEMORY AREA SELECT," the digital camera shows the memory area select screen 21 again, allowing the user to change the partition for recording/reproducing. When the user chooses "PASSWORD CHANGE," the digital camera performs the password change processing in S5. When the user chooses "CLOSE," the digital camera returns to the shooting mode in S3 again and shows the see-through screen 24 on the built-in LCD 12.

Suppose that the user chose "MEMORY AREA SELECT" on the screen 27 to display the memory area select screen 21. Then, if the partition for recording/reproducing is changed to another, the camera parameters are updated. In this case, the descriptive contents of the camera parameter setting file recorded on the partition set for recording/reproducing just before the change is updated to the camera parameters set for the digital camera just before the change.

Figure 7:
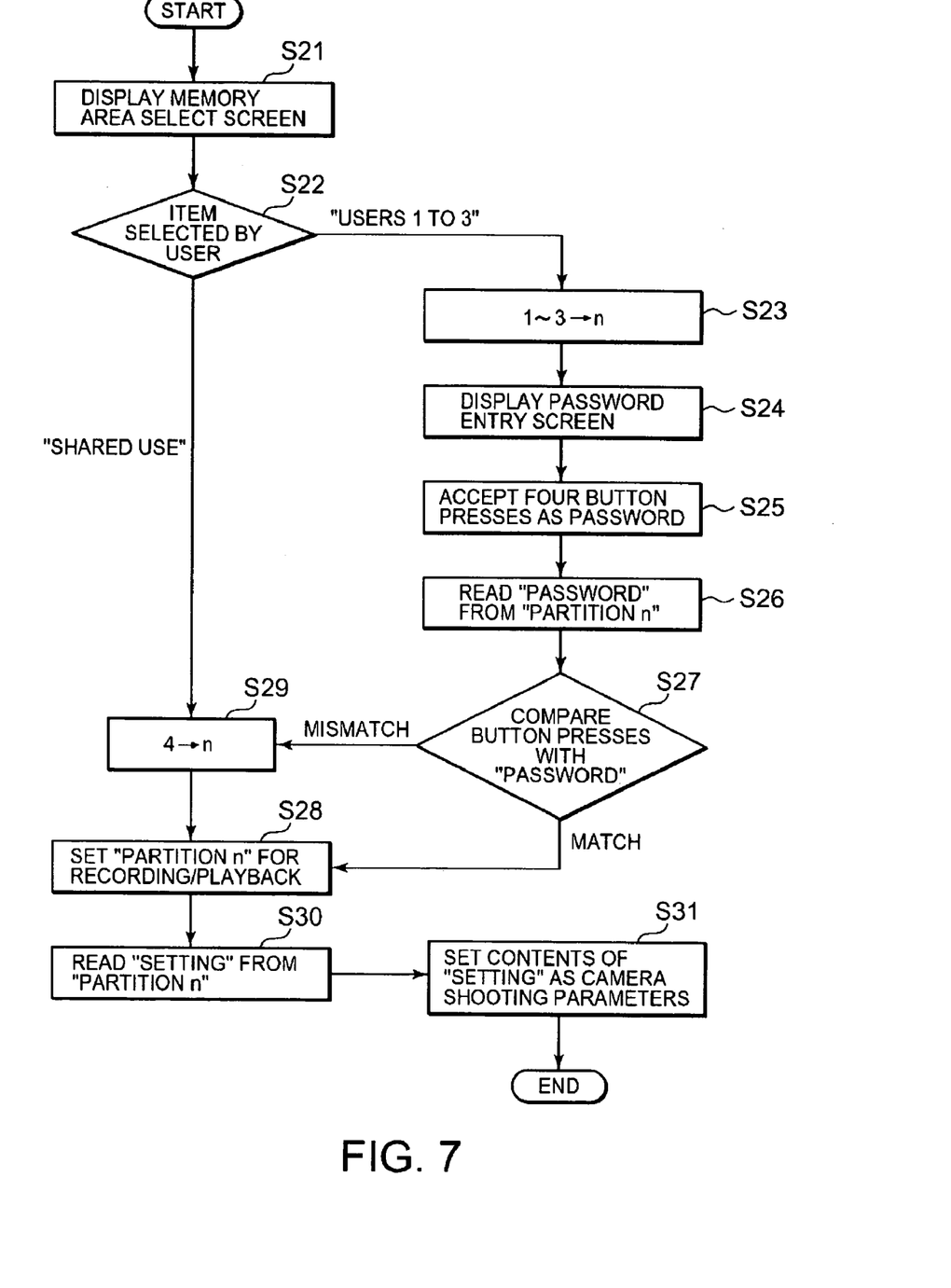
FIG. 7 is a flowchart showing the details of the processing S2 to S4.

FIG. 7 is a flowchart showing the details of S2 to S4.

As shown in FIG. 7, when the user presses the power button in the power-off state of the camera, the digital camera shows the memory area select screen 21 (S21) and determines which item the user selects on the screen 21 (S22).

In S22, when any one of "USER 1," "USER 2," and "USER 3" is selected, the procedure goes to S23 in which n=1 is set for "USER 1," n=2 is set for "USER 2," or n=3 is set for "USER 3." Then, the password entry screen 23 is displayed (S24) to accept four button pressing operation sequence as a password (S25). Then, the password file (PASSWORD) is read from the "PARTITION n" of the recording medium 9 (S26) to check whether the read password matches the password (four button presses) accepted in S25 (S27). When they match, the "PARTITION n" is set for recording/reproducing (S28), that is, the "PARTITION n" is set as the partition used.

On the other hand, when "SHARED USE" is selected in S22, or when the passwords do not match in S27, n=4 is set (S29) to set the "PARTITION 4" for recording/reproducing (S28). In other words, the "PARTITION 4" is set as the partition used.

Following S28, the camera parameter setting file ("SETTING") is read from the "PARTITION n" (S30), and the descriptive contents are set as the camera parameters of the digital camera (S31), thus ending this flow.

In the processing S2 to S4 described using FIGS. 6 and 7, a partition is set for recording/reproducing based on the item selected on the memory area select screen 21 and the matching/mismatching of the password entered on the password entry screen 23.

Figure 8:
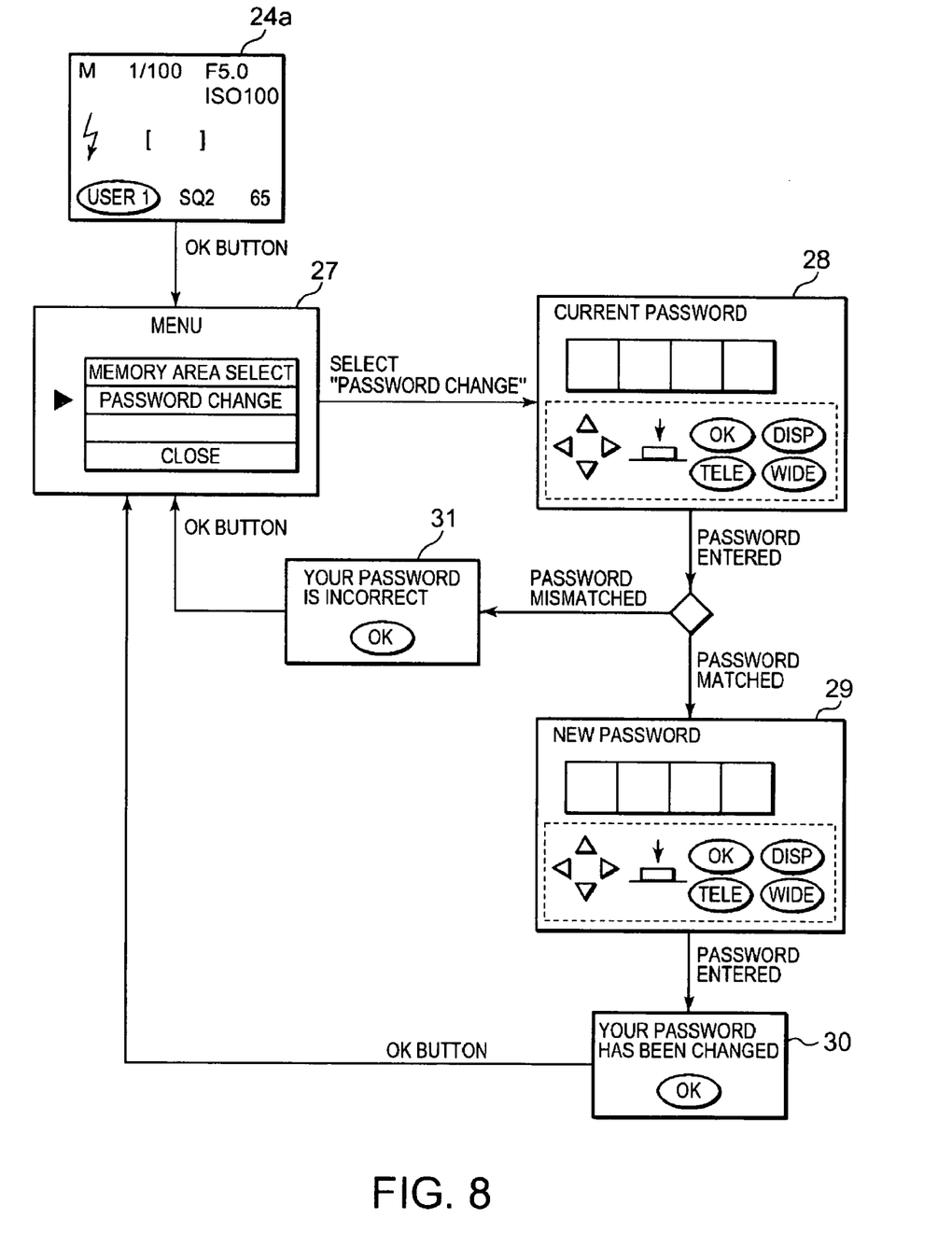
FIG. 8 is a diagram for giving a detailed description of password change processing S5 using the images of screens displayed on the built-in LCD.

FIG. 8 is a diagram for giving a detailed description of the password change processing S5 using the images of screens displayed on the built-in LCD 12.

As shown, in the ready state when the see-through screen 24a is displayed, if the user presses the OK button, the digital camera shows the shooting mode menu screen 27. When "PASSWORD CHANGE" is chosen on the screen 27, a first password change screen 28 for accepting the entry of the current password before change is displayed on the built-in LCD 12. The password is entered on the screen 28 in the same manner as on the password entry screen 23 (and on a second password change screen to be described later).

However, if the partition currently set for recording/reproducing is the partition for "SHARED USE," "PASSWORD CHANGE" cannot be selected because no password file is used.

When the user enters the current password on the first password change screen 28, the digital camera checks whether the password matches the password described in the password file recorded on the partition currently set for recording/reproducing. When they match, a second password change screen 29 for accepting the entry of a new password (after change) is displayed on the built-in LCD 12.

When the user enters a new password on the second password change screen 29, the digital camera creates a new password file describing the new password, and replaces the password file recorded on the partition currently set for recording/reproducing with the newly created password file. After the completion of replacement, a password change confirmation (complete) screen 30 appears on the built-in LCD 12.

On the other hand, if the password entered on the first password change screen 28 does not match the password recorded, a password mismatch screen 31 appears.

Then, if the OK button is pressed on the password change screen 30 or the password mismatch screen 31, the shooting mode menu screen 27 is displayed again on the built-in LCD 12.

Figure 9:
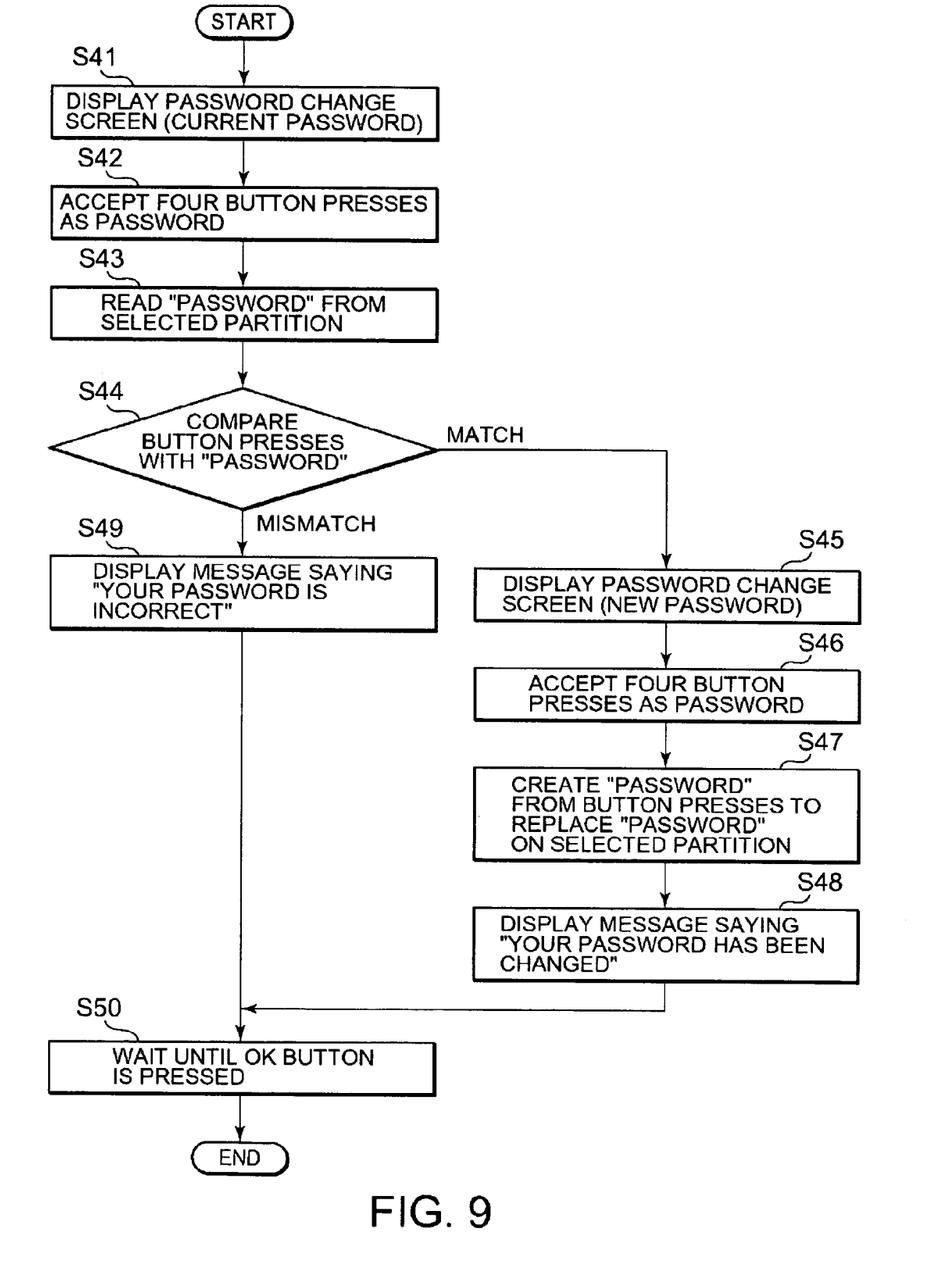
FIG. 9 is a flowchart showing the details of the processing S5.

FIG. 9 is a flowchart showing the details of S5.

As shown in FIG. 9, when the partition currently set for recording/reproducing is a partition other than that for "SHARED USE," if the user selects "PASSWORD CHANGE" on the shooting mode menu screen 27, the digital camera shows the password change screen 28 (S41) to accept four button presses as the current password (S42). Then, the digital camera reads the password file ("PASSWORD") from the partition (being selected) for recording/reproducing (S43) to check whether the read password matches the password accepted in S42 (S44).

When determining in S44 that the passwords match, the digital camera shows the second password change screen 29 (S45) to accept four button presses as a new password (S46). Then, the digital camera creates a new password file ("PASSWORD") describing the password accepted in S46, and replaces the password file recorded on the partition (being selected) for recording/reproducing with the newly created password file (S47). After the completion of password change, the password confirmation (complete) screen 30 appears saying "Your password has been changed" (S48).

On the other hand, when it is determined in S44 that the passwords do not match," the password mismatch screen 31 appears saying "Your password is incorrect" (S49).

Following S48 or S49, the digital camera stands ready until the user presses the OK button (S50), and ends this flow at a press of the OK button.

In the processing S5 described using FIGS. 8 and 9, password change is enabled only when the password entered on the first password change screen 28 matches the password recorded.

Figure 10:
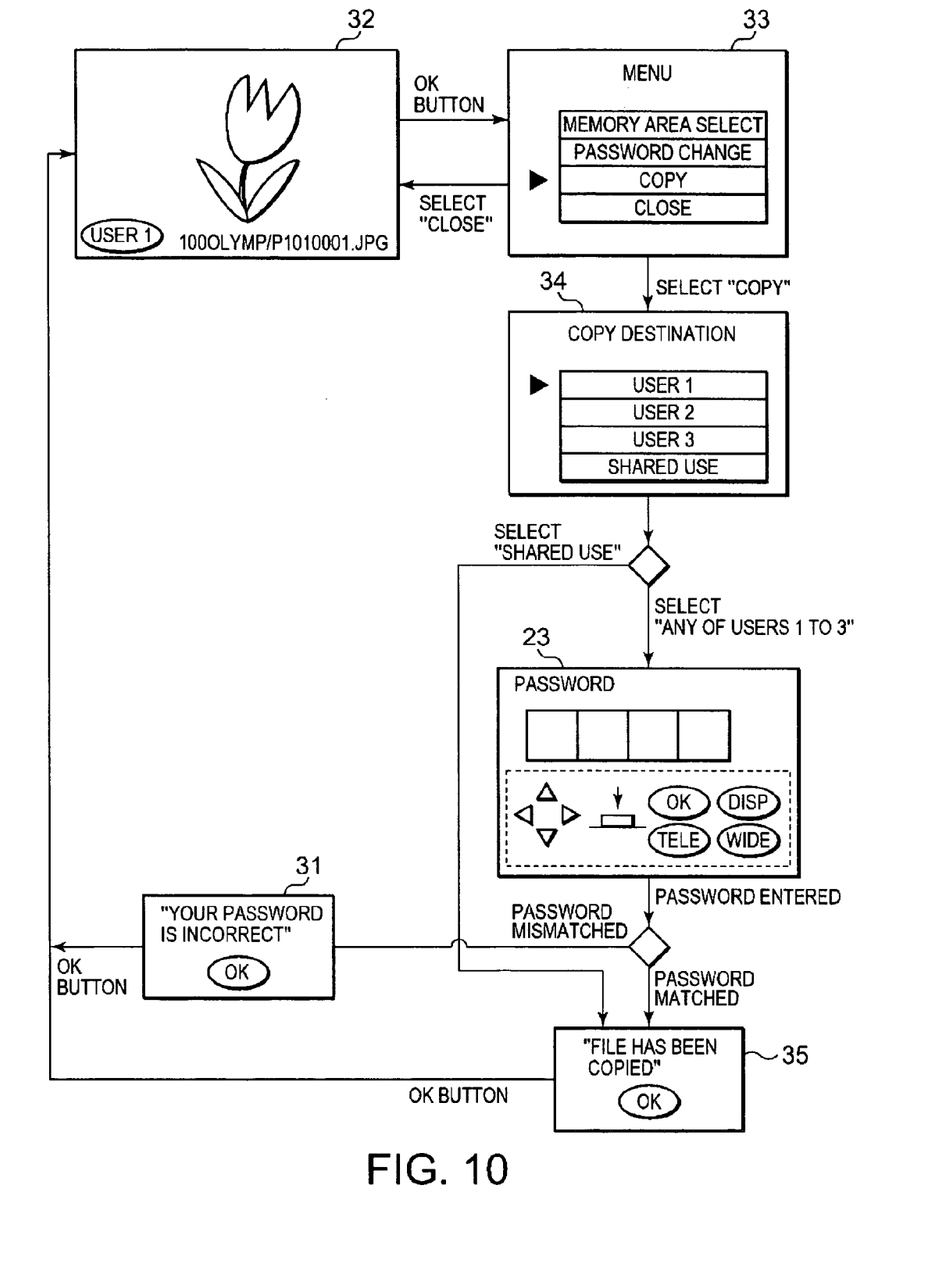
FIG. 10 is a diagram for giving a detailed description of inter-partition image file copying in S9 using the images of screens displayed on the built-in LCD.

FIG. 10 is a diagram for giving a detailed description of inter-partition image file copying in S9 using the images of screens displayed on the built-in LCD 12. Note that the term "copying" includes moving of image files.

As shown in FIG. 10, when the OK button is pressed in the reproduction mode, the processing S7 is initiated and a reproduction mode menu screen 33 is displayed on the built-in LCD 12. Suppose here that the OK button is pressed while an image 32 is being displayed. The file name of an image and the name of an allocated destination partition set for recording/reproducing are superimposed on the display of the image to be displayed in the reproducing. In case of the image 32, the file name "1000LYP/P1010001.jpg" and the partition name "USER 1" set for recording/reproducing are superimposed on the display of the image 32.

On the reproduction mode menu screen 33, "MEMORY AREA SELECT," "PASSWORD CHANGE," "COPY," and "CLOSE" are displayed as menu items or options. When "MEMORY AREA SELECT" is selected, the memory area select screen as described above using FIG. 6 is displayed on the built-in LCD 12, allowing the user to change the partition for recording/reproducing without returning to the shooting mode. When "PASSWORD CHANGE" is selected, the password change screen as described above using FIG. 6 is displayed on the built-in LCD 12, allowing the user to change the password without returning to the shooting mode. When "COPY" is selected, a copy destination memory area selecting screen (copy destination partition selecting screen) 34 is displayed on the built-in LCD 12, allowing the user to select a copy destination partition for the image 32 being reproduced before the screen 33 appears. When "CLOSE" is selected, the procedure returns to the reproduction mode in S6 to reopen the image 32 being reproduced before the screen 33 appears.

On the copy destination memory area selecting screen 34, allocated destination partitions "USER 1," "USER 2," "USER 3," and "SHARED USE" are displayed as selectable copy destination partitions. Note that the partition currently set for recording/reproducing cannot be selected on the screen 34.

When the user chooses any one of "USER 1," "USER 2," and "USER 3," the digital camera shows the password entry screen 23 on the built-in LCD 12 to accept four button presses as a password related to the copy destination partition chosen. Then, the digital camera checks whether the password accepted matches the password described in the password file recorded on the partition related to the item selected on the copy destination memory area selecting screen 34. If they match, an image file related to the image 32 is copied to the partition related to the item selected on the copy destination memory area selecting screen 34. After completion of copying, a file copy confirmation (complete) screen 35 is displayed on the built-in LCD 12. On the other hand, if the password entered on the password entry screen 23 does not match the password recorded, the password mismatch screen 31 appears.

Further, if "SHARED USE" is selected on the copy destination memory area selecting screen 34, the image file related to the image 32 is copied to the partition 9e for "SHARED USE," and after the completion of copying, the file copy confirmation (complete) screen 35 is displayed on the built-in LCD 12.

Then, when the user presses the OK button on the password confirmation (complete) screen 35 or the password mismatch screen 31, the digital camera returns to the reproduction mode in S6 again to resume the reproduction of the image 32 that was being reproduced before the start of file copying.

Figure 11:
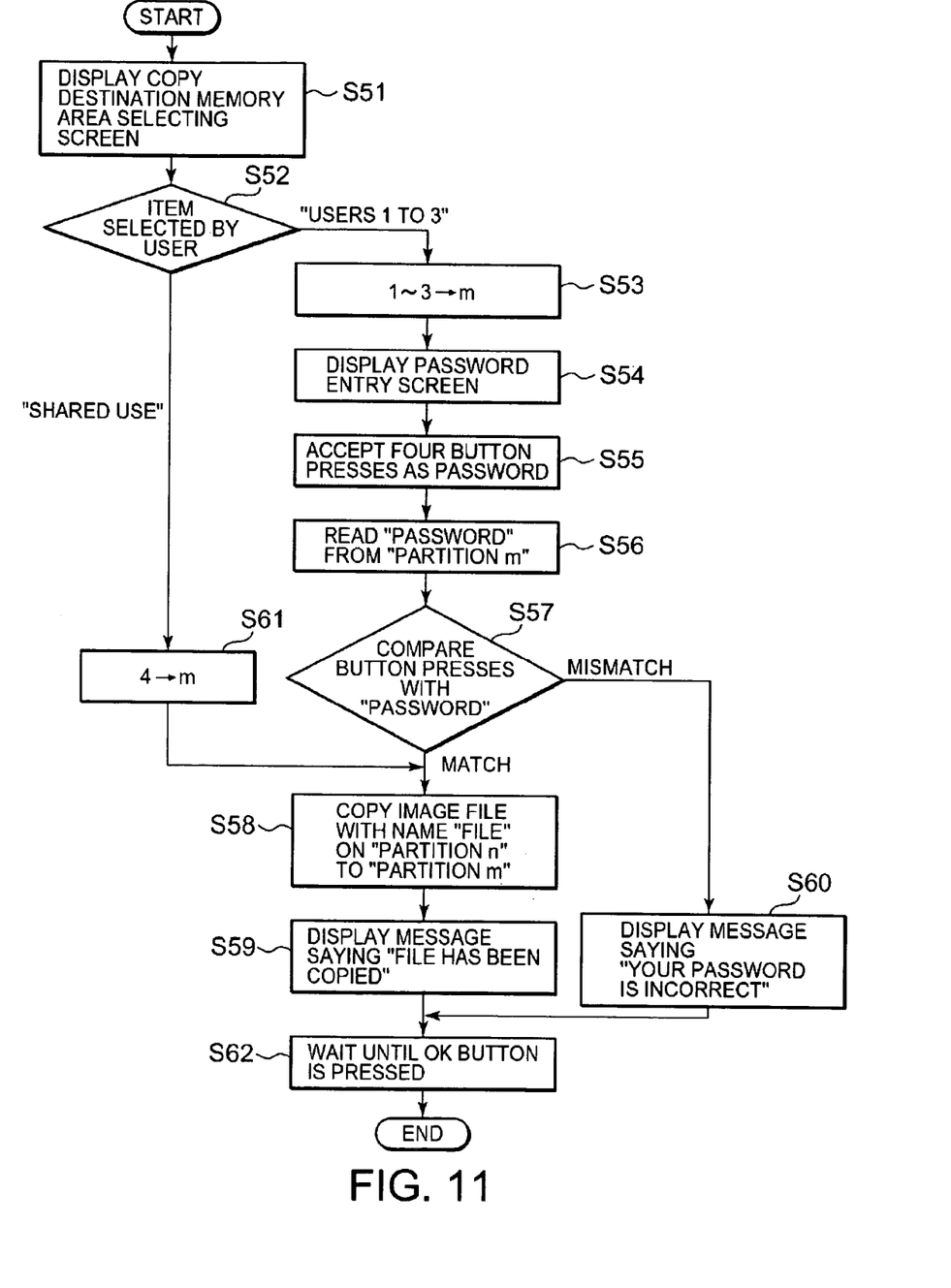
FIG. 11 is a flowchart showing the details of the processing S9.

FIG. 11 is a flowchart showing the details of S9.

In this flow, the partition currently set for recording/reproducing is "PARTITION n" and the file name of an image being reproduced before the reproduction mode menu screen 33 appears is "FILE."

As shown, when the user presses the OK button in the reproduction mode and selects "COPY" on the reproduction mode menu screen 33, the digital camera shows the copy destination memory area selecting screen 34 on the built-in LCD 12 (S51). Then, the digital camera determines which item the user selects on the screen 34 (S52).

In S52, when any one of "USER 1," "USER 2," and "USER 3" is selected, the procedure goes to S53 in which m=1 is set for "USER 1," m=2 is set for "USER 2," or m=3 is set for "USER 3." Then, the password entry screen 23 is displayed (S54) to accept four button presses as a password related to the copy destination partition (S55). Then, the password file (PASSWORD) is read from the "PARTITION m" of the recording medium 9 (S56) to check whether the read password matches the password (four button presses) accepted in S55 (S57). If they match, the image file "FILE" on the "PARTITION n" is copied to the "PARTITION m" (S58). After the completion of copying, the copy confirmation (complete) screen 35 appears on the built-in LCD 12 saying "the file has been copied" (S59).

The image file (the file name of which is "FILE") created in S58 on the copy destination "PARTITION m" is created according to DCF mentioned above. For example, if there is an image file having the same name on the "PARTITION m," the file is saved as another name according to DCF.

On the other hand, if it is determined in S57 that the passwords do not match, the password mismatch screen 31 appears saying "Your password is incorrect" (S60).

Further, when the user selected the "SHARED USE" item in S52, m=4 is set and the procedure goes to S58 to perform processing S58 and S59.

Following S59 or S60, the digital camera stands ready until the user presses the OK button (S62), and ends this flow at a press of the OK button.

In the processing S9 described using FIGS. 10 and 11, the determinations are made according to the criteria: one is the item selected on the copy destination memory area selecting screen 34 and the other is verification that the password related to the copy destination partition entered on the password entry screen 23 matches the password recorded. According to the determination results, any image file recorded on the partition allocated to the user can be copied to another partition.

Similarly, any image file recorded on the partition allocated to the user can also be moved to another partition.

Figure 12:
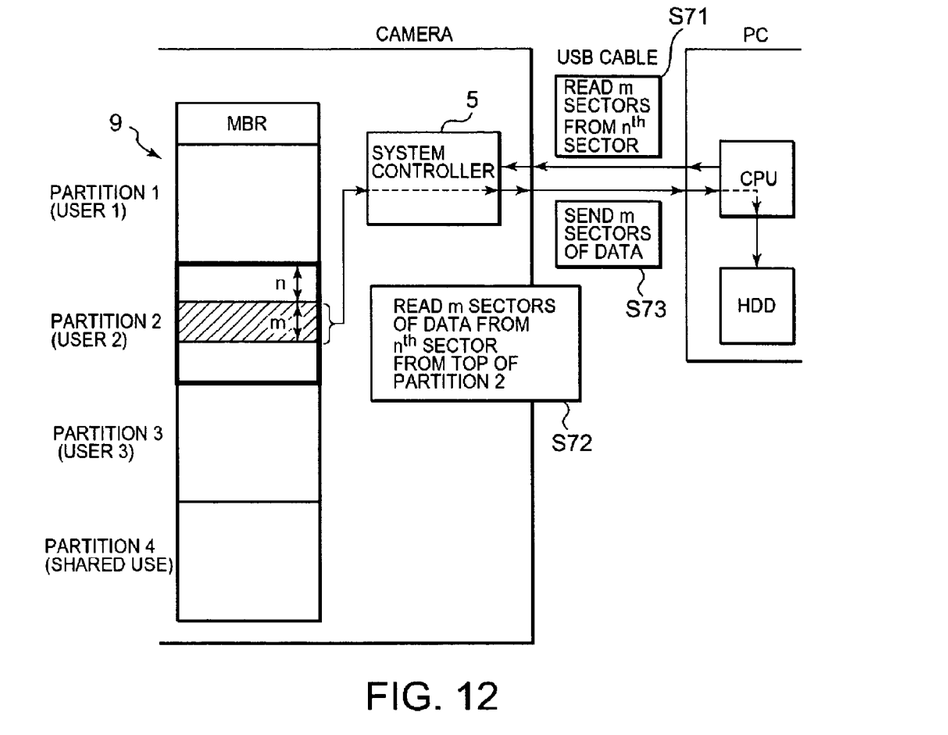
FIG. 12 is a diagram for giving a description of exemplary processing in a USB communication mode of S11.

FIG. 12 is a diagram for giving a description of exemplary processing in a USB communication mode of S11. The processing is performed when the external I/F 16 of the digital camera is connected to a PC through the USB cable so that the PC will read image data recorded on the recording medium 9 of the digital camera.

In the example of FIG. 12, it is assumed that the partition set for recording/reproducing in the digital camera when the PC is connected to the digital camera is the partition 9c ("PARTITION 2").

In this case, the PC connected to the digital camera through the USB cable can access only a single partition, that is, the partition 9c set for recording/reproducing on the recording medium 9. Specifically, for example, when the PC sends the digital camera a command to "Read m sectors from the $n^{th}$ sector" as shown in FIG. 12 (S71), the system controller 5 of the digital camera reads m sectors starting from the $n^{th}$ sector from the first sector of the partition 9c set for recording/reproducing (S72), and sends the m sectors of data to the PC (S73). Based on such processing involving S71 to S73, the PC analyzes FAT and directory entries on the single partition to acquire a desired file. In other words, the PC cannot access partitions (in this case, "PARTITION 1," "PARTITION 3," and "PARTITION 4") other than the partition set for recording/reproducing.

In the processing S11 described above using FIG. 12, the PC can access only the partition set for recording/reproducing in the digital camera. This disables each user from accessing image data recorded on partitions allocated to the other users even through the PC.

As described above, according to the embodiment, when the recording medium 9 is shared among multiple people, each user can protect his or her image data from being accessed by the other users. This can prevent image data of each user from being reproduced, erased, or copied by the other users.

The digital camera according to the embodiment uses a combination of button press operations as a password, but one or more characters or symbols (hereinafter called "characters, etc.") can also be assigned to each button like on a cell phone so that the user will press buttons to use the entered characters, etc. as a password. In this case, the digital camera checks whether the characters, etc. entered match the characters, etc. described in the password file to determine whether to allow the use of the partition. The determination as to whether to allow the use of the partition can also be made by methods other than password, such as by using authentication technology like fingerprint verification.

Further, the digital camera according to the embodiment incorporates the recording medium 9, but the recording medium can also be removable one. In this case, it should be noted that when the recording medium 9 is removed from the digital camera and attached to an external reader, any partition of the recording medium 9 becomes accessible.

While there has been shown and described what is considered to be one preferred embodiment of the invention, it will, of course, be understood that various modifications and changes in form or detail could readily be made without departing from the spirit of the invention.

It is therefore intended that the invention not be limited to the exact forms described and illustrated, but constructed to cover all modifications that may fall within the scope of the appended claims.

What is claimed is:

1. An image recording apparatus comprising:
a recording medium divided into multiple partitions, each of the multiple partitions stores a password file describing a password for allocating each of the multiple partitions to a user;
a first selection section for selecting a partition from the multiple partitions as a partition to be used;
a first determination section for determining whether a user intending to use the partition is the user to whom the partition selected by the first selection section is allocated; and
a setting section for setting the partition selected by the first selection section as the partition to be used when the first determination section determines that the user intending to use the partition is the user to whom the partition selected by the first selection section is allocated,
wherein the first determination section makes the above-mentioned determination based on an entered password and the password described in the password file recorded on the partition selected by the first selection section.

2. The apparatus according to claim 1 wherein the partition set by the setting section is a recording destination of image data.

3. The apparatus according to claim 1 further comprising a reproducing section for reproducing image data from the recording medium, wherein
the reproducing section uses the partition set by the setting section as a source of image data to be reproduced.

4. An image recording apparatus comprising:
a recording medium divided into multiple partitions;
a first selection section for selecting a partition from the multiple partitions as a partition to be used;
a first determination section for determining whether a user intending to use the partition is the user to whom the partition selected by the first selection section is allocated;
a setting section for setting the partition selected by the first selection section as the partition to be used when the first determination section determines that the user intending to use the partition is the user to whom the partition selected by the first selection section is allocated;
a second selection section for selecting a partition from the multiple partitions as a copying or moving destination partition,
a second determination section for determining whether an entered password matches a password described in a password file recorded on the partition selected by the second selection section, and
a moving section for copying or moving image data from the partition set by the setting section to the partition selected by the second selection section when the second determination section determines that the passwords match.

5. The apparatus according to claim 1 further comprising a password change section for changing the password described in the password file.

6. The apparatus according to claim 1 wherein the password is defined as a combination of operations of buttons provided on the image recording apparatus.

7. An image recording apparatus comprising:
a recording medium divided into multiple partitions, each of the multiple partitions storing an apparatus setup file describing parameters related to the setup of the image recording apparatus;
a first selection section for selecting a partition from the multiple partitions as a partition to be used;
a first determination section for determining whether a user intending to use the partition is the user to whom the partition selected by the first selection section is allocated;
a setting section for setting the partition selected by the first selection section as the partition to be used when the first determination section determines that the user intending to use the partition is the user to whom the partition selected by the first selection section is allocated; and
an apparatus setup file updating section for updating the descriptive contents of the apparatus setup file, wherein
when the image recording apparatus is powered off according to the parameters related to the apparatus settings described in the apparatus setup file recorded on the partition set by the setting section, the apparatus setup file updating section changes the descriptive contents of the apparatus setup file recorded on the partition in use just before power shutdown to the parameters related to the apparatus settings selected for the image recording apparatus just before power shutdown.

8. The apparatus according to claim 1 wherein
when the image recording apparatus is communicably connected to an external device, the partition of the recording medium that the external device can access is limited to the partition set by the setting section.

9. An image recording apparatus comprising:
a recording medium divided into multiple partitions, each of the multiple partitions storing an apparatus setup file describing parameters related to the setup of the image recording apparatus;
a first selection section for selecting a partition from the multiple partitions as a partition to be used;
a first determination section for determining whether a user intending to use the partition is the user to whom the partition selected by the first selection section is allocated;

a setting section for setting the partition selected by the first selection section as the partition to be used when the first determination section determines that the user intending to use the partition is the user to whom the partition selected by the first selection section is allocated; and an apparatus setup file updating section for updating the descriptive contents of the apparatus setup file, wherein when the setting section changes the current partition to another partition according to the parameters related to the apparatus settings described in the apparatus setup file recorded on the partition set by the setting section, the apparatus setup file updating section changes the descriptive contents of the apparatus setup file recorded on the partition in use just before the change to the parameters related to the apparatus settings selected for the image recording apparatus just before the change.

10. An image recording apparatus comprising:

a recording medium divided into multiple partitions, each of the multiple partitions stores a password file describing a password for allocating each of the multiple partitions;

a first selection section for selecting a partition from the multiple partitions;

a first determination section for determining whether an entered password is allocated to the password file stored on the partition selected by the first selection section; and a setting section for setting the partition selected by the first selection section as the partition to be used when the first determination section determines that an entered password is allocated to the password file stored on the partition selected by the first selection section.

* * * * *